C. C. Bradley, Jr.,
Grinding Metals.
No. 954. Reissued May 1, 1860.
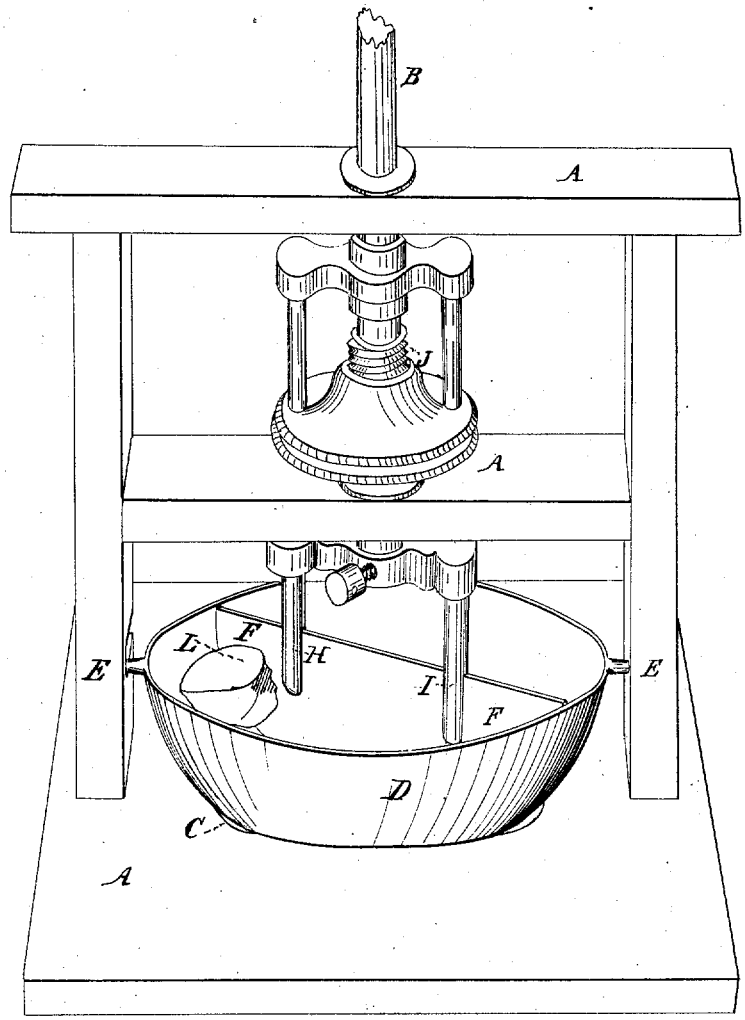
N. PETERS, PHOTO-LITHOGRAPHER, WASHINGTON, D. C.

UNITED STATES PATENT OFFICE.

CHRISTOPHER C. BRADLEY, JR., OF SYRACUSE, NEW YORK.

IMPROVEMENT IN GRINDING THE INNER SURFACE OF CAST-IRON KETTLES.

Specification forming part of Letters Patent No. 16,679, dated February 24, 1857; Reissue No. 954, dated May 1, 1860.

*To all whom it may concern:*

Be it known that I, CHRISTOPHER C. BRADLEY, Jr., of the city of Syracuse, in the county of Onondaga, of the State of New York, have invented a new and useful Improvement in Grinding the Inner Surface of Kettles and Similar Metal Castings; and I do hereby declare and ascertain my said invention, referring to the accompanying drawing, in which a general view of the machine or mode of carrying out my invention is shown.

My invention is intended to be used in grinding out the inner surface of large kettles, such as are generally used in manufacturing salt, &c., and for other like purposes where an exact and true outline is not required. For this purpose I make a suitable frame-work, A, of sufficient strength and size for the work to be done. In the base of this frame-work I form a recess or depression, *e*, to receive the bottom part of the kettle, and in this the kettle is firmly secured. Directly over the center of the kettle there is a vertical shaft, *b*, from the lower end of which two arms, H and I, depend, secured to a cross-piece, as clearly seen in the drawing, so as to be made to revolve with the shaft. To these arms a plate, F, is affixed, in form like a cross-section of the interior of the kettle, but a little smaller. This plate, F, is made to revolve within the kettle, and sweeps around a number of pieces of grindstone or other suitable material placed within the kettle on each side of the plate F, which, by its rotation, causes them to rub against the inner surface of the kettle, and thus grind it smooth, however irregular the surface is cast.

When the motion of the plate F is slow, the loose pieces of stone will act on the surface of the kettle at or near the bottom. As the motion is increased, the pieces of stone rise, and by the centrifugal action are forced to act against the sides, rising higher as the motion is increased, until the whole surface to the top is sufficiently ground.

By this method of grinding the inner surface of kettles, by forcing around the loose pieces of grinding material against the surface, it is found they work into all the uneven spots, and the whole surface is perfectly ground.

Having thus fully described my invention in grinding the inner surface of kettles, what I claim, and desire to secure by Letters Patent, is—

Forcing around the interior surface loose pieces of grinding material by means of revolving wings or other sufficient apparatus, which shall cause said loose pieces to revolve around while they are left free to act upon the surface with which they are brought into contact, substantially in the manner and for the purpose set forth.

C. C. BRADLEY, JR.

Witnesses:
M. G. HUBBARD,
E. E. LEWIS.